(12) United States Patent
Lim et al.

(10) Patent No.: US 12,738,582 B2
(45) Date of Patent: Sep. 15, 2026

(54) BATTERY MODULE INCLUDING SWELLING RELIEF UNIT

(71) Applicant: LG ENERGY SOLUTION, LTD., Seoul (KR)

(72) Inventors: Jae Hwan Lim, Daejeon (KR); Bong Keun Kwon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 631 days.

(21) Appl. No.: 17/917,528

(22) PCT Filed: Jan. 11, 2022

(86) PCT No.: PCT/KR2022/000416

§ 371 (c)(1),
(2) Date: Oct. 6, 2022

(87) PCT Pub. No.: WO2022/149941

PCT Pub. Date: Jul. 14, 2022

(65) Prior Publication Data

US 2023/0135785 A1 May 4, 2023

(30) Foreign Application Priority Data

Jan. 11, 2021 (KR) ........................ 10-2021-0003604

(51) Int. Cl.

*H01M 50/242* (2021.01)
*H01M 10/04* (2006.01)

(Continued)

(52) U.S. Cl.

CPC ..... *H01M 50/242* (2021.01); *H01M 10/0481* (2013.01); *H01M 50/209* (2021.01);

(Continued)

(58) Field of Classification Search

None

See application file for complete search history.

(56) References Cited

U.S. PATENT DOCUMENTS

2015/0079452 A1* 3/2015 Park .................... H01M 50/264 429/156
2015/0303425 A1 10/2015 Kong (Continued)

FOREIGN PATENT DOCUMENTS

CN 106450072 A 2/2017
CN 206250253 U 6/2017

(Continued)

OTHER PUBLICATIONS

Machine Translation of WO2020262812A (Year: 2020).*

*Primary Examiner* — Gregg Cantelmo

(74) *Attorney, Agent, or Firm* — Bryan Cave Leighton Paisner LLP

(57) ABSTRACT

The present disclosure relates to a battery module including a swelling relief unit, and more particularly a battery module including a cell stack constituted by one or more stacked battery cells and a module case configured to receive the cell stack therein, wherein a swelling relief unit is disposed so as to face an outermost battery cell disposed at an outermost side of the cell stack, the swelling relief unit having a convex portion configured to press at least a part of the battery cell.

7 Claims, 6 Drawing Sheets

(51) Int. Cl.

| | |
|---|---|
| ***H01M 50/209*** | (2021.01) |
| ***H01M 50/211*** | (2021.01) |
| ***H01M 50/291*** | (2021.01) |
| ***H01M 50/293*** | (2021.01) |

(52) U.S. Cl.

CPC ....... *H01M 50/211* (2021.01); *H01M 50/291* (2021.01); *H01M 50/293* (2021.01)

(56) References Cited

U.S. PATENT DOCUMENTS

| | | | |
|---|---|---|---|
| 2016/0028050 | A1 | 1/2016 | Shiraishi |
| 2017/0047562 | A1 | 2/2017 | Ogawa et al. |
| 2017/0234930 | A1 | 8/2017 | Lee et al. |
| 2017/0256761 | A1 | 9/2017 | Ogawa et al. |
| 2018/0062127 | A1 | 3/2018 | Lee et al. |
| 2018/0175343 | A1 | 6/2018 | Choi et al. |
| 2018/0183025 | A1 | 6/2018 | Cao et al. |
| 2018/0261821 | A1 | 9/2018 | Ogawa et al. |
| 2019/0027797 | A1 | 1/2019 | Paramasivam et al. |
| 2019/0348650 | A1 | 11/2019 | Nakamoto |
| 2019/0363392 | A1 | 11/2019 | Kim et al. |
| 2020/0343498 | A1 | 10/2020 | Schuessler et al. |
| 2020/0403196 | A1 | 12/2020 | Jeong et al. |
| 2020/0411924 | A1 | 12/2020 | Yun |
| 2021/0036277 | A1 | 2/2021 | Seo et al. |
| 2021/0057689 | A1 | 2/2021 | Park et al. |
| 2021/0265685 | A1 | 8/2021 | Jeong et al. |
| 2021/0344057 | A1 | 11/2021 | Seo et al. |
| 2022/0166097 | A1 | 5/2022 | Kim et al. |
| 2023/0047201 | A1 | 2/2023 | Seo et al. |

FOREIGN PATENT DOCUMENTS

| | | | | |
|---|---|---|---|---|
| CN | 107851759 A | 3/2018 | | |
| CN | 110392944 A | 10/2019 | | |
| CN | 210123769 U | 3/2020 | | |
| CN | 211654989 U | 10/2020 | | |
| EP | 2421069 A1 * | 2/2012 | ............ H01M 10/04 | |
| JP | 2009-182001 A | 8/2009 | | |
| JP | 2017-037789 A | 2/2017 | | |
| JP | 6258272 B2 | 1/2018 | | |
| JP | 6292677 B2 | 3/2018 | | |
| JP | 6426779 B2 | 11/2018 | | |
| JP | 2018533825 A | 11/2018 | | |
| JP | 6730431 B2 | 7/2020 | | |
| JP | 2020524888 A | 8/2020 | | |
| KR | 10-2017-0023583 A | 3/2017 | | |
| KR | 10-2017-0111566 A | 10/2017 | | |
| KR | 10-2017-0135597 A | 12/2017 | | |
| KR | 10-2150679 B1 | 9/2020 | | |
| KR | 10-2020-0131619 A | 11/2020 | | |
| KR | 10-2020-0145414 A | 12/2020 | | |
| KR | 10-2021-0000548 A | 1/2021 | | |
| WO | 2018-163708 A1 | 11/2019 | | |
| WO | 2020116825 A1 | 6/2020 | | |
| WO | WO-2020262812 A1 * | 12/2020 | ........ H01M 10/0481 | |

* cited by examiner

【FIG. 1】
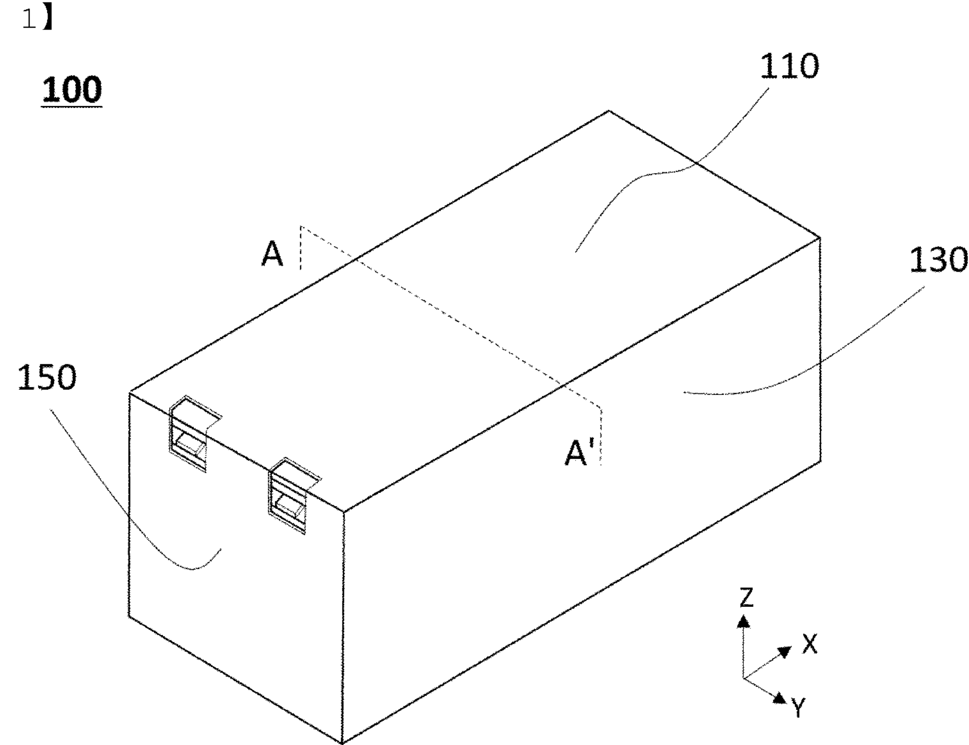
【FIG. 2】
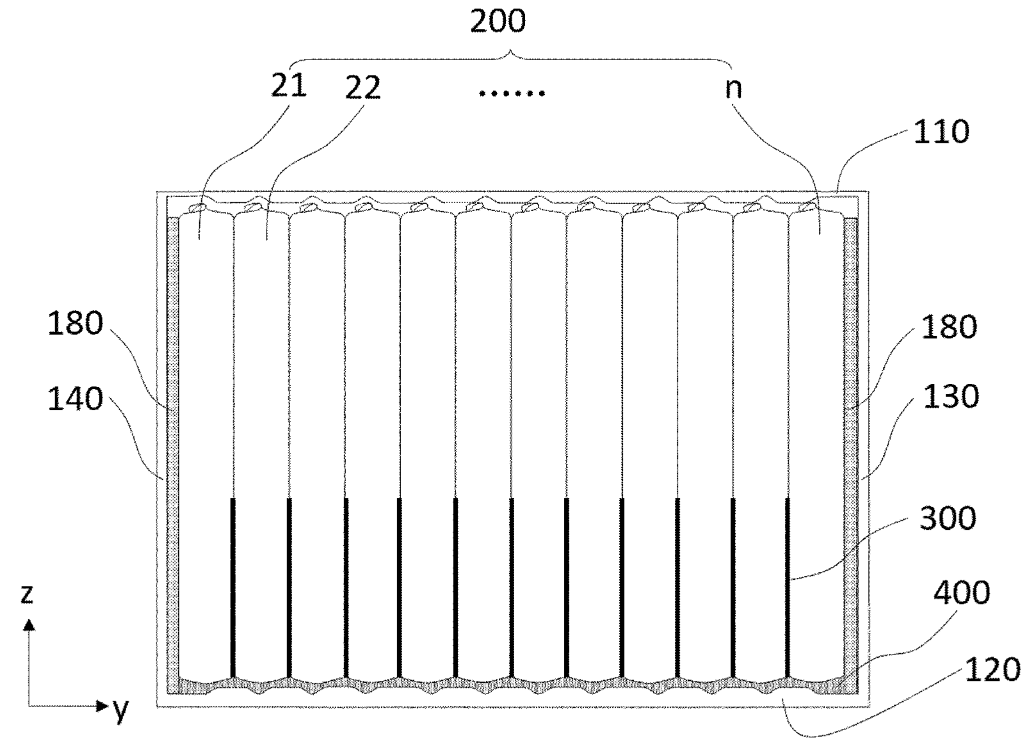

【FIG. 3】
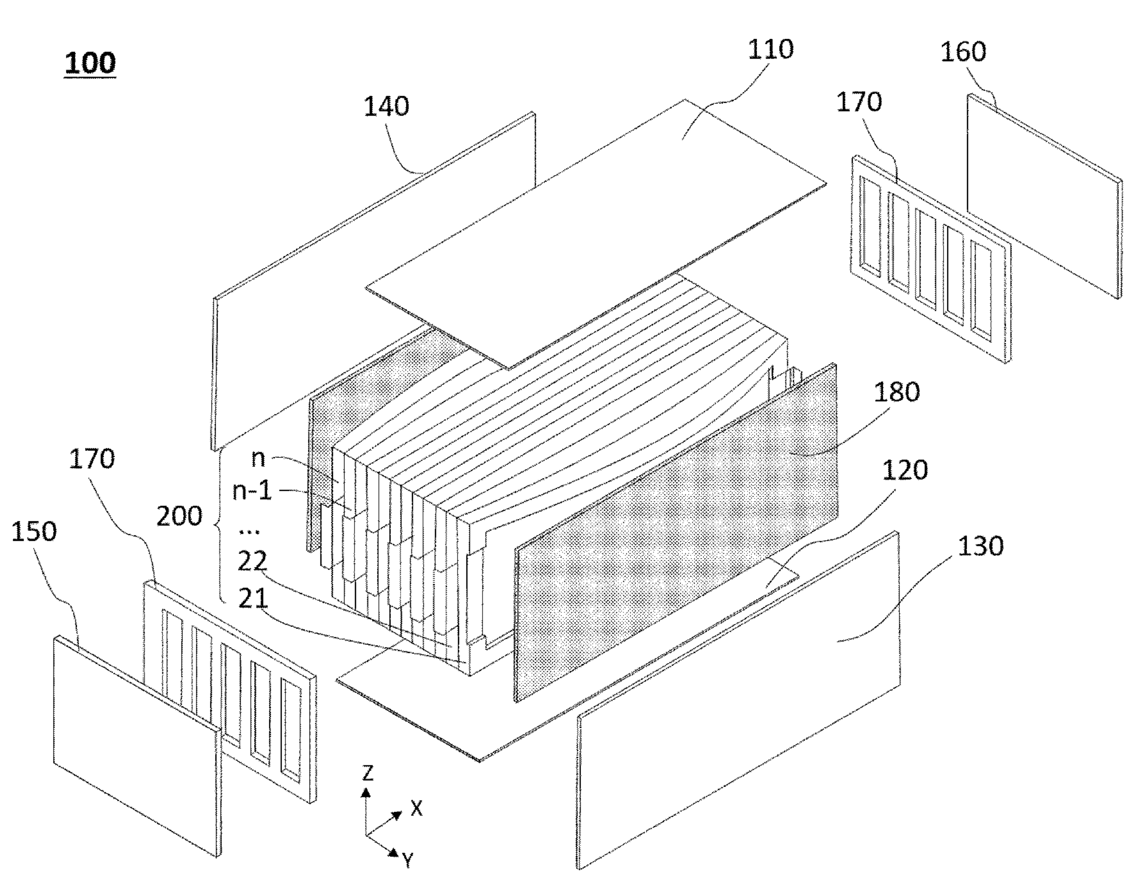

【FIG. 4】
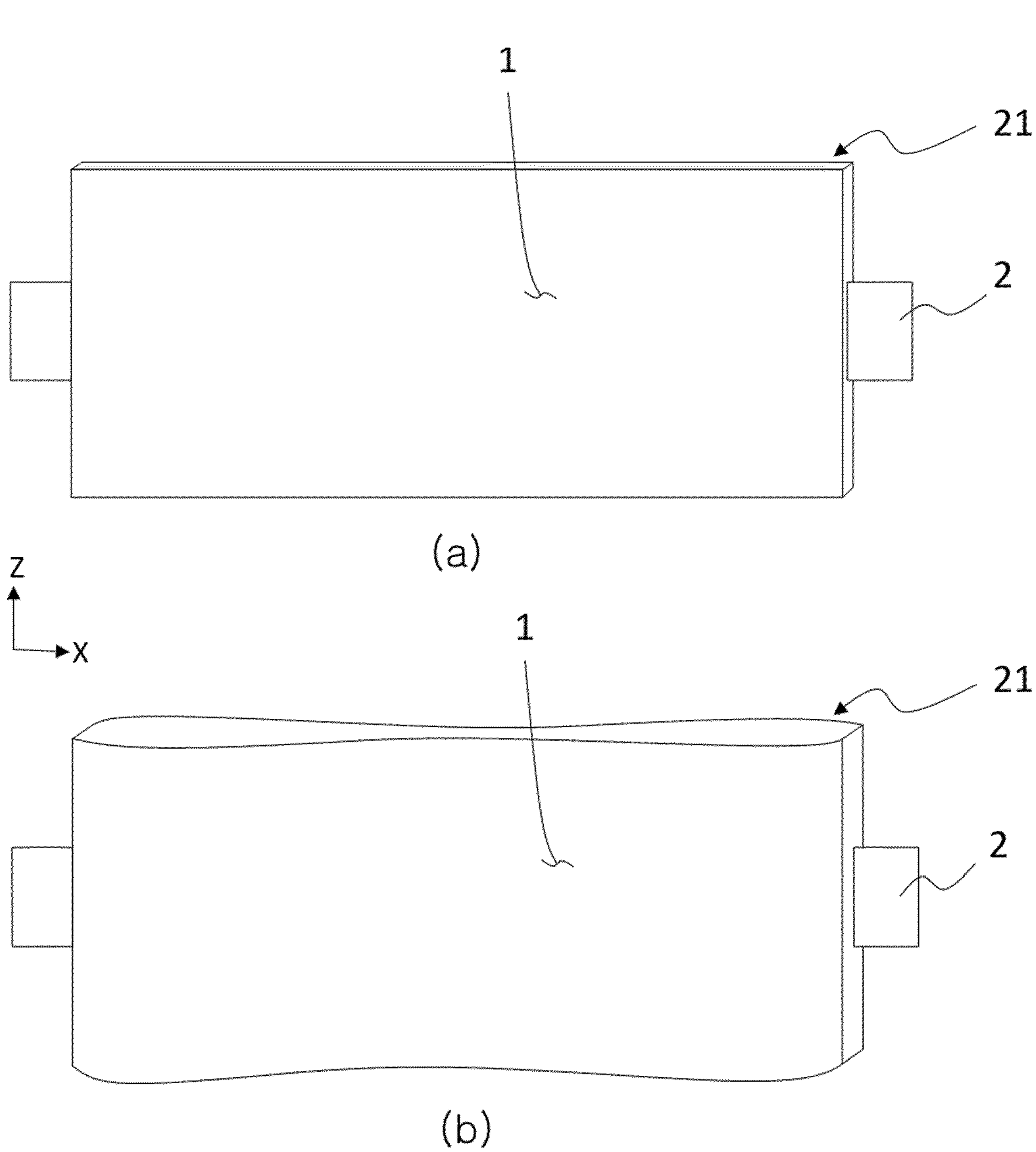

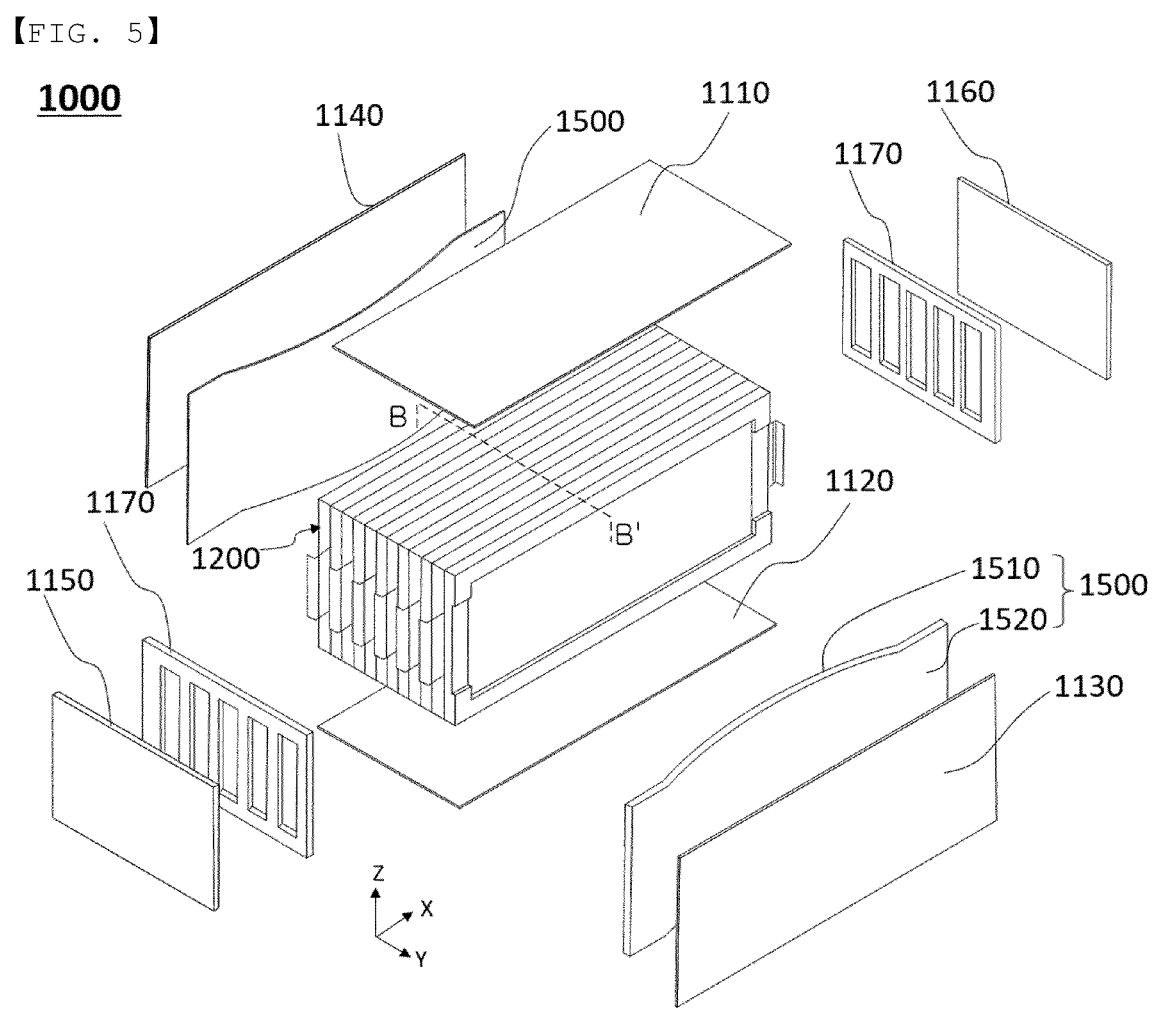

【FIG. 5】

【FIG. 6】
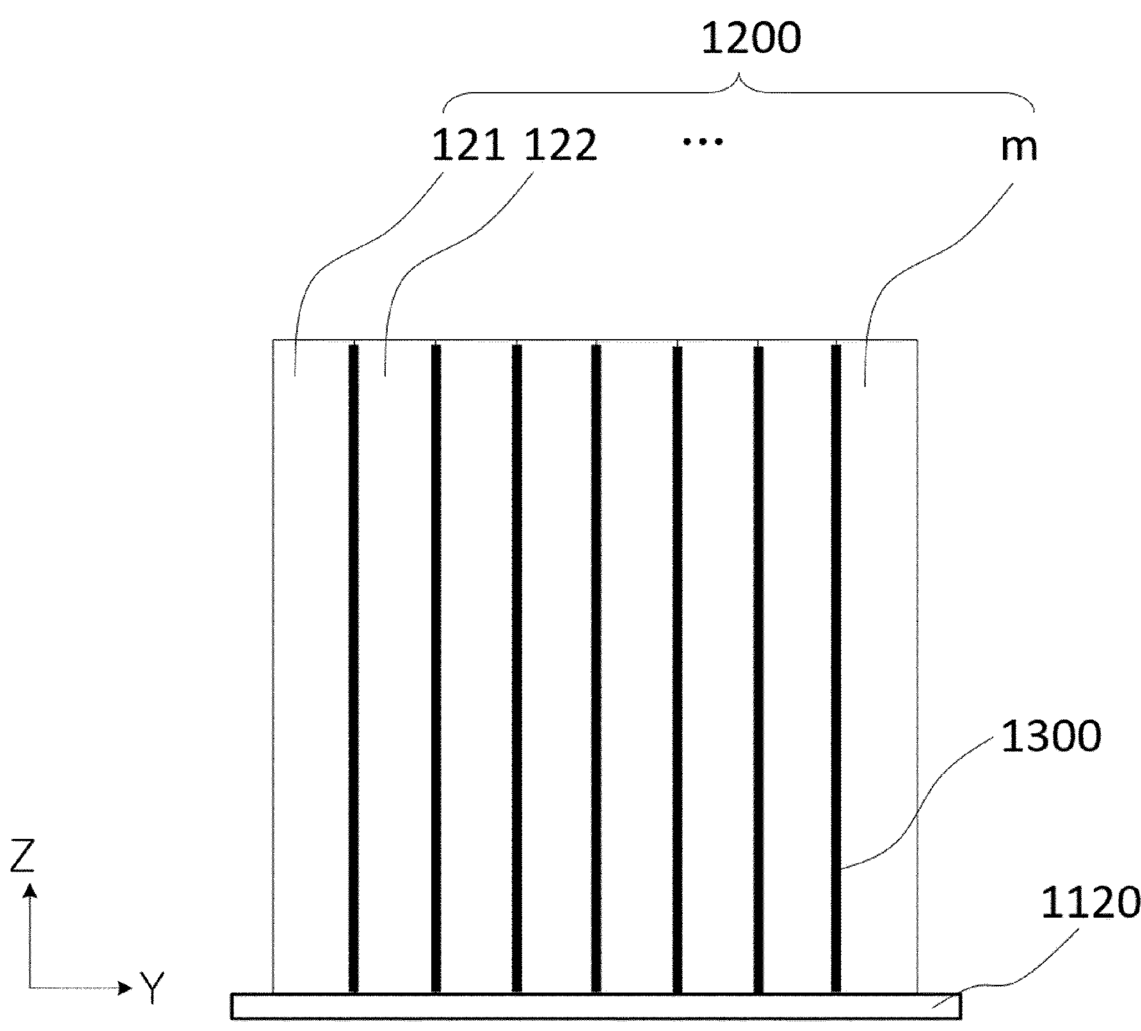

【FIG. 7】
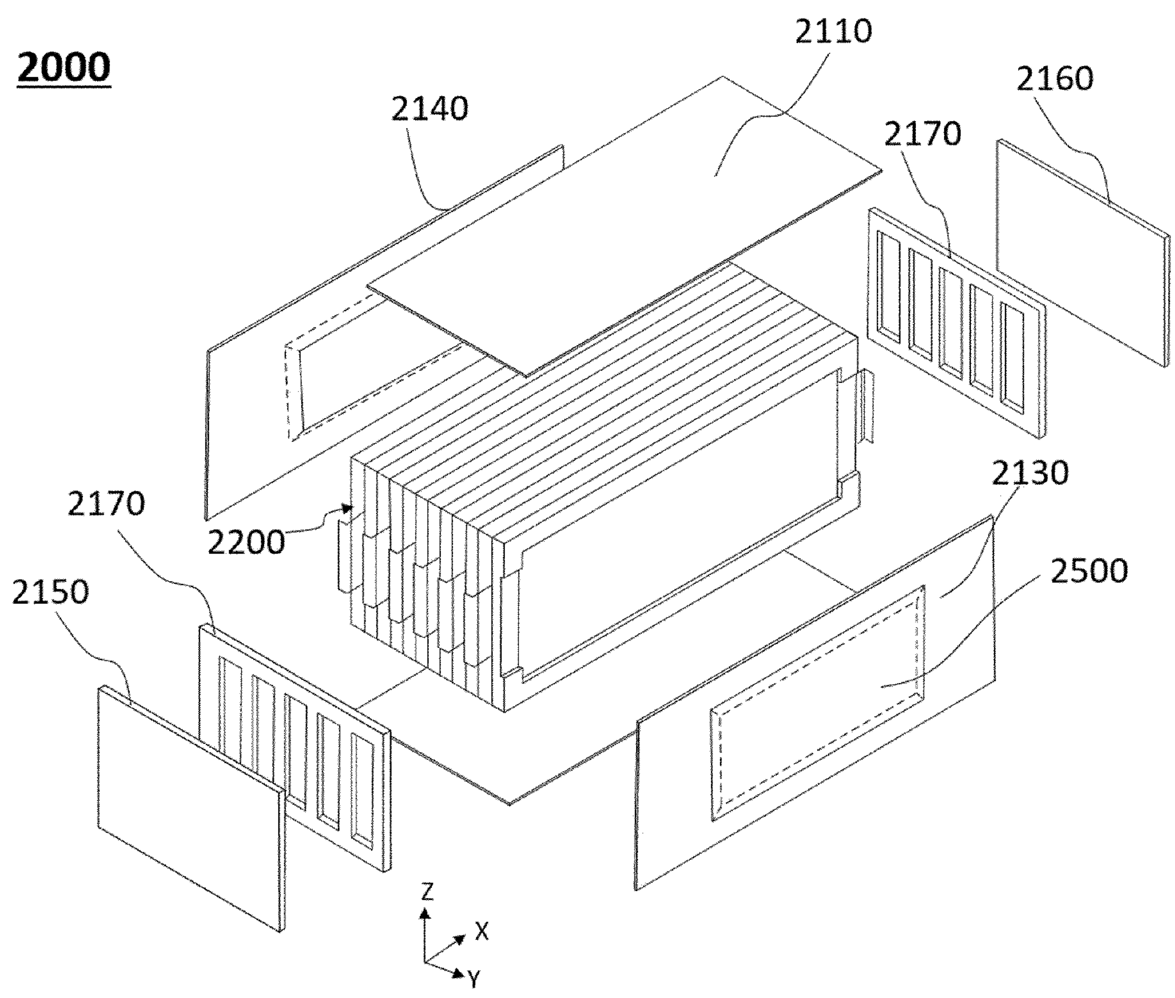

BATTERY MODULE INCLUDING SWELLING RELIEF UNIT

CROSS-REFERENCE TO RELATED APPLICATIONS

This application is a National Phase entry pursuant to 35 U.S.C. § 371 of International Application No. PCT/KR2022/000416, filed on Jan. 11, 2022, and claims the benefit of and priority to Korean Patent Application No. 10-2021-0003604, filed on Jan. 11, 2021, the disclosures of which are incorporated by reference in their entirety for all purposes as if fully set forth herein.

TECHNICAL FIELD

The present disclosure relates to a battery module including a swelling relief unit. More particularly, the present disclosure relates to a battery module including a swelling relief unit capable of pressing a battery cell, wherein the swelling relief unit is disposed at a case of a module case and/or in the case of the module case in order to alleviate the behavior of lithium plating, thereby preventing reduction in lifespan of the battery cell.

BACKGROUND

With an increase in demand for mobile devices, such as smartphones, demand for secondary batteries used as energy sources thereof has also increased. In addition, secondary batteries are used in an electric vehicle (EV), a hybrid electric vehicle (HEV), a plug-in hybrid electric vehicle (P-HEV), an energy storage system (ESS), etc.

Demand for a lithium secondary battery, which is one of the secondary batteries, is overwhelmingly high. The lithium secondary battery is operated as the result of lithium ions being repeatedly intercalated and deintercalated into and from a negative electrode and a positive electrode. In an electrolyte containing lithium salt, lithium ions can move between the electrodes, but electrons cannot move between the electrodes.

Lithium precipitation, i.e. so-called lithium plating (Li-plating), causes side reaction with the electrolyte and change in kinetic balance of the secondary battery. As a result, the capacity and cycle lifespan of the battery are reduced, and a safety-related problem in that an overcharging control function is lost occurs. During repeated charging and discharging, lithium metal is dendritically precipitated on the surface of one electrode, which seriously threatens safety of the battery. In the case in which the dendritically precipitated metal lithium penetrates a separator and comes into contact with the other electrode, internal short circuit occurs, and the temperature of the battery is increased due to rapid chemical reaction. As a result, a battery cell or a module may catch fire, which may lead to a dangerous result, such as explosion. Lithium plating more frequently occurs around a position of the battery cell from which an electrode tab protrudes, and the battery cell swells at the position of the battery cell from which the electrode tab protrudes as the number of times of charging and discharging and the number of cycles are increased. This phenomenon more greatly occurs in a battery module including a plurality of stacked battery cells than in a unit battery cell. The cycle lifespan of the battery cells constituting the battery module may be shorter than the cycle lifespan of the unit battery cell, and the scale of the accident may increase due to the plurality of battery cells.

FIGS. 1 to 3 show a conventional battery module 100. Referring to FIGS. 1 to 3, the battery module 100 is configured such that a cell stack 200 constituted by a plurality of stacked battery cells 21, 22, . . . n−1, and n is received in a module case (reference numeral not shown). Wide outer surfaces of the two battery cells 21 and n disposed at the outermost sides of the cell stack 200 may face a first side cover 130 and a second side cover 140 of the module case, respectively, a swelling control pad 180 may be located between each of the outermost battery cells and a corresponding one of the side covers of the module case, and a resin layer 400 configured to fix the cell stack 200 may be interposed between the cell stack 200 and a lower cover 120. In order to guarantee stability of the battery cells 21, 22, . . . , n−1, and n constituting the cell stack 200, an adhesive 300 may be interposed between facing battery cells at a predetermined region.

The battery cells 21, 22, . . . , n−1, and n in the conventional battery module 100 repeatedly swell and contract during charging and discharging, an electrode active material may be separated or degraded due to such deformation of the battery cells, and side reaction may occur, whereby battery performance may be lowered. In order to solve the above problems, the swelling control pad 180 is generally provided between the module case and each of the outermost battery cells or between the battery cells, wherein the swelling relief pad is compressed to perform a buffering operation when the battery cells swell, thereby controlling swelling of the battery cells.

As shown in FIG. 3, increment in volume of a central part of the battery cell and increment in volume of an edge of the battery cell are different from each other when the battery cell swells. That is, when the volume of the battery cell expands, the central part of the battery cell swells into a pot shape, compared to the edge of the battery cell. If the entirety of the surface of the battery cell that swells is uniformly supported, the battery cell is deformed by gas generated in the battery cell and lithium plating occurring due thereto.

FIG. 4 is a schematic view illustrating a battery cell before and after deformation thereof using one outermost battery cell 21, among the conventional battery cells 21, 22, . . . , n−1, and n, by way of example. Such swelling may occur in all of the battery cells including the outermost battery cells. Referring to FIG. 4, parts of the battery cell 21 adjacent to electrode tabs and electrode leads 2 relatively greatly swell. Since swelling of the central part is inhibited, left and right side parts of the battery cell at which the electrode tabs are located swell due to gases generated in the battery cell. The battery cell is more greatly deformed as charging and discharging are continuously performed. Each battery cell swells, and the cell stack 200, in which the plurality of battery cells are coupled to each other, is more greatly deformed, which reduces the lifespan of the battery module 100 and furthermore causes an accident, such as fire.

In order to extend the lifespan of the battery cells 21, 22, . . . , n−1, and n in the battery module 100 and to improve stability of the battery module, it is necessary to relieve swelling of the battery cells in the battery module 100 due to lithium plating. However, there is a limitation in inhibiting lithium plating phenomenon due to the electrochemical mechanism of the battery cell.

Patent Document 1 discloses a lithium secondary battery configured such that a microcapsule including a stabilization material configured to stabilize lithium precipitated from a negative electrode when the secondary battery is overcharged is formed between the negative electrode and a separator, and the surface of the microcapsule is formed as a thermoplastic resin layer configured to collapse when the secondary battery is overcharged in order to discharge the stabilization material.

Patent Document 2 discloses a lithium precipitation detection method of observing a change in voltage of a secondary battery based on SOC at the time of charging the battery to detect precipitation of lithium from a negative electrode in real time, characterized in that a point at which a battery voltage increase rate slows down is determined to be a point at which lithium precipitation occurs.

Patent Documents 1 and 2 disclose technologies for securing safety of the lithium secondary battery due to lithium precipitation, but do not disclose a battery module including a swelling relief unit capable of relieving swelling of a battery cell disposed in the battery module occurring during charging and discharging thereof.

In a battery module including a cell stack constituted by a plurality of stacked battery cells, an effective means capable of solving a problem due to deformation of the battery cells has not yet been suggested.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

(Patent Document 1) Korean Patent Application Publication No. 2017-0111566

(Patent Document 2) Korean Patent Application Publication No. 2017-0023583

DISCLOSURE

Technical Problem

The present disclosure has been made in view of the above problems, and it is an object of the present disclosure to provide a battery module including a swelling relief unit capable of preventing reduction in lifespan of a battery cell in the battery module while a conventional battery module and battery cell are used without change.

It is another object of the present disclosure to provide a battery module including a swelling relief unit capable of rapidly moving gas generated during use of the battery module to the periphery of a battery cell without staying in an electrode assembly of the battery cell.

Technical Solution

In order to accomplish the above objects, a battery module according to the present disclosure includes a cell stack comprising one or more battery cells and a module case housing the cell stack therein, a swelling relief unit facing an outermost battery cell of the cell stack, wherein the swelling relief unit comprises a convex portion pressing at least a part of the one or more battery cells.

The swelling relief unit may be located between the outermost battery cell and the module case.

The battery module may comprise a plurality of swelling relief units including the swelling relief unit which may be disposed to face both outermost battery cells of the cell stack.

The convex portion of the swelling relief unit may be located at only a predetermined region of a central part of the outermost battery cell.

The convex portion of the swelling relief unit may be made of an elastic material.

The convex portion of the swelling relief unit may be deformed into a concave shape when a predetermined pressure or higher is applied thereto.

The one or more battery cells may comprise two adjacent battery cells, and an adhesive may be interposed between facing surfaces of the two adjacent battery cells.

The adhesive may be applied to entireties of the facing surfaces of the battery cells.

The swelling relief unit may be integrally formed at a side cover of the module case.

In addition, the present disclosure provides a battery pack including the battery module and a device including the battery pack.

In the present disclosure, one or more constructions that do not conflict with each other may be selected and combined from among the above constructions.

Advantageous Effects

In a battery module according to the present disclosure, a Swelling relief unit is disposed at each outermost battery cell in order to inhibit abnormal swelling of battery cells and the battery module depending on the number of times of charging and discharging, whereby it is possible to prevent reduction in lifespan of the battery cells and to improve stability of the battery cells.

A convex portion of the swelling relief unit is deformed into a concave shape when a predetermined pressure or higher is applied thereto, whereby pressure applied to a central part of the battery cell and the battery module is reduced. As a result, the periphery of an electrode tab does not swell, whereby occurrence of lithium plating may be alleviated, and therefore it is possible to prevent an increase in internal temperature of the battery cell and an accident related to the battery module, such as fire, depending thereon.

Since the swelling relief unit according to the present disclosure is easily disposed in a conventional battery module without change, it is not necessary to change a battery module production process, which is economically advantageous.

Since an adhesive layer is applied to the entirety of each of facing surfaces of adjacent battery cells in the battery module, gas generated in the battery cell during charging and discharging may be moved to the periphery of the battery cell, whereby it is possible to prevent nonuniform degradation of the battery cell.

BRIEF DESCRIPTION OF DRAWINGS

FIG. 1 is a schematic view of a conventional battery module.

FIG. 2 is a sectional view taken along line A-A' of FIG. 1.

FIG. 3 is an exploded perspective view of the battery module shown in FIG. 1.

FIG. 4 is a schematic view illustrating a conventional battery cell before and after deformation thereof.

FIG. 5 is an exploded perspective view of a battery module according to a first embodiment of the present disclosure.

FIG. 6 is a sectional view taken along line A-A' of FIG. 5.

FIG. 7 is an exploded perspective view of a battery module according to a second embodiment of the present disclosure.

DETAILED DESCRIPTION

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a battery module according to the present disclosure will be described with reference to the accompanying drawings.

FIG. 5 is an exploded perspective view of a battery module according to a first embodiment of the present disclosure, and FIG. 6 is a sectional view taken along line A-A' of FIG. 5.

Referring to FIGS. 5 and 6, the battery module 1000 according to the first embodiment of the present disclosure may include a cell stack 1200 constituted by a plurality of stacked battery cells (reference numeral not shown) and a swelling relief unit 1500 disposed in a module case (reference numeral not shown) having an approximately hexahedral outer shape.

The module case may include an upper cover 1110, a lower cover 1120, a first side cover 1130 and a second side cover 1140 facing each other so as to be located toward side surfaces of the cell stack 1200, which are wide surfaces), and a front cover 1150 and a rear cover 1160 located at the surfaces of the cell stack at which electrode tabs are disposed.

Here, the front cover 1150 and the rear cover 1160 are disposed so as to face in directions in which electrode leads of the battery cells are located in order to protect the electrode leads and busbars 1170, and the pair of side covers 1130 and 1140 protect the side surfaces (XZ planes) of the cell stack 1200 received in the module case.

The upper cover 1110 and the lower cover 1120 protect an upper part and a lower part of the cell stack 1200, respectively.

The upper cover 1110, the lower cover 1120, the pair of side covers 1130 and 1140, the front cover 1150, and the rear cover 1160 may be individually manufactured and may then be assembled with each other. Alternatively, some of the covers may be integrally formed as needed.

The battery cells having the above construction are disposed in the module case in tight contact with each other in the state in which the side surfaces (XZ planes) of the battery cells are erected parallel to the first side cover 1130 and the second side cover 1140 of the module case.

The cell stack 1200, which is received in an inner space of the module case, is configured such that the plurality of battery cells is stacked in the state in which the wide surfaces of the battery cells are in tight contact with each other, and each of the battery cells includes a cell case (not shown) configured to receive an electrode assembly (not shown) and electrode leads (not shown).

The cell case is a pouch-shaped cell case (made of a laminate sheet), wherein at least one electrode assembly is received in a receiving portion, and an edge of the receiving portion is fused, whereby the receiving portion is hermetically sealed, and a pair of electrode leads is connected to opposite sides or one side of the electrode assembly so as to protrude outwards from the cell case. Of course, positive electrode tabs and negative electrode tabs of the electrode assembly may be electrically connected to each other, respectively, and may be exposed outwards from the cell case, or the electrode leads may be directly connected to the electrode assembly without tabs.

The electrode assembly may be a jelly-roll type electrode assembly, which is configured to have a structure in which a long sheet type positive electrode and a long sheet type negative electrode are wound in the state in which a separator is interposed therebetween, a stacked type electrode assembly, which is configured to have a structure in which a rectangular positive electrode and a rectangular negative electrode are stacked in the state in which a separator is interposed therebetween, a stacked and folded type electrode assembly, which is configured to have a structure in which unit cells are wound using a long separation film, or a laminated and stacked type electrode assembly, which is configured to have a structure in which battery cells are stacked in the state in which a separator is interposed therebetween and are then attached to each other. However, the present disclosure is not limited thereto.

It is obvious that an electrolyte in the battery cell may be replaced by a solid electrolyte or a gel type quasi-solid electrolyte obtained by adding an additive to a solid electrolyte, the gel type quasi-solid electrolyte having an intermediate phase between a liquid and a solid, in addition to a liquid electrolyte, which is commonly used.

The electrode assembly is received in the cell case, and the cell case is generally configured to have a laminate sheet structure including an inner layer, a metal layer, and an outer layer. The inner layer is disposed in direct contact with the electrode assembly, and therefore the inner layer must exhibit high insulation properties and high resistance to an electrolytic solution. In addition, the inner layer must exhibit high sealability in order to hermetically seal the cell case from the outside, i.e. a thermally-bonded sealed portion between inner layers must exhibit excellent thermal bonding strength. The inner layer may be made of a material selected from among a polyolefin-based resin, such as polypropylene, polyethylene, polyethylene acrylate, or polybutylene, a polyurethane resin, and a polyimide resin, which exhibit excellent chemical resistance and high sealability. However, the present disclosure is not limited thereto, and polypropylene, which exhibits excellent mechanical-physical properties, such as tensile strength, rigidity, surface hardness, and impact resistance, and excellent chemical resistance, is the most preferably used.

The metal layer, which is disposed so as to abut the inner layer, corresponds to a barrier layer configured to prevent moisture or various kinds of gas from permeating into the battery from the outside. An aluminum thin film, which is lightweight and easily shapeable, may be used as a preferred material for the metal layer.

The outer layer is provided on the other surface of the metal layer. The outer layer may be made of a heat-resistant polymer that exhibits excellent tensile strength, resistance to moisture permeation, and resistance to air transmission such that the outer layer exhibits high heat resistance and chemical resistance while protecting the electrode assembly. As an example, the outer layer may be made of nylon or polyethylene terephthalate. However, the present disclosure is not limited thereto.

The swelling relief unit 1500 according to the first embodiment of the present disclosure may be located between the pair of side covers 1130 and 1140 of the module case and the cell stack 1200.

The swelling relief unit 1500 may include a flat portion 1520, which is approximately flat, and a convex portion 1510 formed so as to protrude toward the cell stack 1200 based on a wide surface (XZ plane) of the flat portion 1520. Specifically, the convex portion 1510 may be located at a central part of the flat portion 1520 in a longitudinal direction (X-axis direction), and the convex portion 1510 may be located in tight contact with a central part of the outermost side surface (X-axis direction in XZ plane) of the battery cell located at the outermost side of the cell stack 1200. In addition, the part of the convex portion 1510 disposed in tight contact with the outermost side surface of the outmost battery cell of the cell stack 1200 may be flat or arc-shaped.

In the initial stage of charging and discharging, the central part of the battery cell swells. Consequently, the convex portion 1510 of the swelling relief unit 1500 may be disposed in tight contact with a predetermined region of the central part of the battery cell, as described above, in order to relieve swelling through deformation thereof when a predetermined pressure is applied thereto, which is advantageous in lifespan extension. In the present disclosure, the convex portion 1510 of the swelling relief unit 1500 is located in tight contact with or adjacent to the outermost battery cell of the cell stack 1200 so as to face the outermost battery cell of the cell stack. When the battery cell swells and the pressure in the battery cell reaches a predetermined pressure or higher during charging of the battery cell, a convex surface of the convex portion 1510 is deformed in a direction toward each of the side covers 1130 and 1140 of the module case. During discharging of the battery cell, the battery cell contracts, and the deformed convex portion 1510 returns to the outermost battery cell corresponding thereto. At this time, the flat portion 1520 is not deformed, i.e. the initial shape of the flat portion is maintained.

When the battery cell swells by a predetermined volume or more during charging and discharging of the battery cell, whereby the pressure applied to the convex portion 1510 is equal to or higher than a predetermined pressure, the convex portion 1510 is generally deformed into a concave shape. The convex surface of the convex portion 1510 is generally permanently deformed in a direction toward each of the side covers 1130 and 1140 of the module case, whereby the convex portion 1510 has a concave shape. As a result, no pressure is applied to the battery cell that has swollen to a predetermined level or more. The convex portion 1510 is deformed so as to be closer to each of the side covers 1130 and 1140 of the module case than the flat portion 1520. In the present disclosure, the swelling relief unit 1500, which is deformed during charging and discharging of the battery cell, may be used to adjust the extent of pressure applied to the battery cell during charging and discharging of the battery cell. The battery cell naturally swells due to charging and discharging thereof, and therefore it is possible to provide pressure the most suitable to improve safety and lifespan of the battery cell.

In the present disclosure, the swelling relief unit 1500 may be made of an elastic material in order to inhibit swelling of the battery cell in the initial stage. When the battery cell swells, swelling pressure of the battery cell is applied to the convex portion 1510 of the swelling relief unit 1500 located in tight contact with the battery cell. The convex portion 1510, which is convex toward the side surface of the battery cell, may be deformed by swelling of the battery cell. If the convex portion 1510 is made of no elastic material, the convex portion may be ruptured by swelling pressure of the battery cell, whereby the battery cell may be damaged, which may lead to an accident, such as fire. When the swelling relief unit 1500 is made of an elastic material, therefore, the swelling relief unit is easily deformed when the battery cell swells, which is advantageous in accident prevention. In addition, the flat portion 1520 of the swelling relief unit 1500 remains flat irrespective of deformation of the battery cell due to swelling and/or contraction thereof, which is advantageous in relieving deformation of the battery cell due to lithium plating occurring as the result of gas generated in the battery cell moving to opposite ends of the battery cell.

The convex portion 1510 may be brought into tight contact with the entirety or a portion of the battery cell in a height direction (Z-axis direction). Specifically, the convex portion may be disposed from the center to opposite sides of the battery cell in the height direction in a symmetrical fashion. As a result, the convex portion 1510 is brought into tight contact with the outside of the cell case at the center to opposite ends of the battery cell in the height direction that relatively easily swell, which is advantageous in relieving swelling.

Here, the swelling relief unit 1500 may be made of an elastic metal or synthetic resin. Specifically, the swelling relief unit may be made of a soft elastic material, such as polyurethane (PU) or ethylene propylene diene monomer (EPDM). Since the above elastic material has excellent vibration absorption and compression repulsion, the battery module 1000 may have excellent dimensional stability even though the plurality of battery cells swells. In the present disclosure, the materials for the swelling relief unit are not limited to the above materials as long as the swelling g relief unit is capable of inhibiting swelling of the battery cell and at the same time being deformed after the shape of the swelling relief unit is maintained until the pressure in the battery cell reaches a predetermined pressure.

Although not shown in FIG. 5, the swelling relief unit 1500 according to the first embodiment of the present disclosure may be configured such that the convex portion 1510 is formed at the central part of the flat portion 1520, and one or more convex portions 1510 may be formed. However, the number of convex portions 1510 is not particularly restricted as long as it is possible to relieve swelling of the battery cell due to lithium plating.

Meanwhile, as shown in FIG. 6, an adhesive 1300 may be applied between side surfaces (XZ planes) of adjacent battery cells in order to adhere the battery cells to each other. It is preferable for the adhesive 1300 to be applied to the entirety of the side surfaces of the adjacent battery cells.

The adhesive 1300 may be applied to all of the side surfaces of the battery cells 121, 122, . . . , and m, which are disposed in tight contact with each other, constituting the cell stack 1200, whereby the adjacent battery cells may be stably coupled to each other in tight contact with each other, and therefore the cell stack 1200 may have a more stable structure. Consequently, it is possible to stably receive the cell stack 1200 in the module case without disposition of a resin layer 400 used in a conventional battery module on the lower cover 1120.

The resin layer configured to fix the stacked battery cells to the lower surface of the module case in the conventional battery module is not used, which is advantages in gas generated in each battery cell moving toward all peripheries of the battery cell. As a result, the gas generated in the battery cell may be rapidly and effectively diffused, whereby the gas does not stay in the electrode assembly, which is advantageous in relieving swelling of the battery cell and preventing lifespan reduction.

The adhesive 1300 may be made of polyolefin, such as polyethylene (PE), cast polypropylene (cPP), or polypropylene (PP), or a copolymer thereof.

FIG. 7 is an exploded perspective view of a battery module 2000 according to a second embodiment of the present disclosure.

The second embodiment identical to the first embodiment except that a swelling relief unit 2500 is integrally formed at each of a pair of side covers 2130 and 2140 of a module case, and therefore only the swelling relief unit 2500 will be described hereinafter.

In the second embodiment of the present disclosure, the swelling relief unit 2500 may be formed at a central part of each of the first side cover 2130 and the second side cover 2140 of the module case in a longitudinal direction (X-axis direction). Here, each side cover may constitute a flat portion of the swelling relief unit 2500, and a part of the side cover may be bent so as to be convex toward a cell stack 2200.

FIG. 7 shows that the swelling relief unit 2500 is located at the central part of each of the side covers 2130 and 2140 of the module case in a height direction (Z-axis direction). However, the present disclosure is not limited thereto as long as the swelling relief unit is provided over the entirety of the side cover in the height direction (Z-axis direction) and the side covers 2130 and 2140, an upper cover 2110, and a lower cover 2120 are coupled to each other to constitute the module case. In addition, as shown in FIG. 7, the swelling relief unit 2500 may be quadrangular. Alternatively, the swelling relief unit may be polygonal, circular, or oval. However, the shape of the swelling relief unit is not particularly restricted as long as the swelling relief unit is elastically deformable due to swelling of the battery cells.

The battery module according to the present disclosure described above is applicable to various kinds of devices or vehicles, such as an electric vehicle or a hybrid electric vehicle.

Although the specific s of the present disclosure have been described in detail, those skilled in the art will appreciate that the detailed description thereof discloses only preferred embodiments of the present disclosure and thus does not limit the scope of the present disclosure. Accordingly, those skilled in the art will appreciate that various changes and modifications are possible, without departing from the category and technical idea of the present disclosure, and it will be obvious that such changes and modifications fall within the scope of the appended claims.

DESCRIPTION OF REFERENCE SYMBOLS

1: Side surface of battery cell
2: Electrode lead
21, 22, 121, 122, m, n−1, n: Battery cells
100: Conventional battery module
110, 1110, 2110: Upper covers
120, 1120, 2120: Lower covers
130, 1130, 2130: First side covers
140, 1140, 2140: Second side covers
150, 1150, 2150: Front covers
160, 1160, 2160: Rear covers
170, 1170, 2170: Busbars
180: Swelling control pad
200, 1200, 2200: Cell stacks
300, 1300: Adhesives
400: Resin layer
1500, 2500, 3500: Swelling relief units
1510, 2510: Convex portions
1520, 2520: Flat portions
1000: Battery module according to first embodiment of present disclosure
2000: Battery module according to second embodiment of present disclosure

INDUSTRIAL APPLICABILITY

The present disclosure relates to a battery module including a cell stack constituted by one or more stacked battery cells and a module case configured to receive the cell stack therein, wherein a swelling relief unit is disposed so as to face an outermost battery cell disposed at an outermost side of the cell stack, the swelling relief unit having a convex portion configured to press at least a part of the battery cell, and therefore the present disclosure has industrial applicability.

The invention claimed is:

1. A battery module comprising:

a cell stack comprising two or more battery cells;

a module case housing the cell stack; and a swelling relief unit facing an outermost battery cell of the cell stack, wherein the outermost battery cell comprises a pair of end portions on which electrode tabs are located, and a center portion between the pair of end portions, wherein the swelling relief unit comprises a flat portion facing the pair of end portions, and a convex portion pressing only the center portion of the outermost battery cell, wherein the module case comprises a side cover, wherein the swelling relief unit is located between the outermost battery cell and the side cover, and wherein the convex portion of the swelling relief unit is configured to permanently deform into a concave shape when a predetermined pressure or higher is applied thereto.

2. The battery module according to claim 1, wherein the two or more battery cells comprise two outermost battery cells, and wherein the battery module comprises a plurality of swelling relief units including the swelling relief unit which are disposed to face the two outermost battery cells of the cell stack.

3. The battery module according to claim 1, wherein the convex portion of the swelling relief unit is made of an elastic material.

4. The battery module according to claim 1, wherein the two or more battery cells comprise two adjacent battery cells, and an adhesive is interposed between the two adjacent battery cells.

5. The battery module according to claim 4, wherein the adhesive is applied to entire facing surfaces of the two adjacent battery cells.

6. A battery pack comprising the battery module according to claim 1.

7. A device comprising the battery pack according to claim 6.

* * * * *